United States Patent [19]

Zielonka

[11] Patent Number: 5,318,248

[45] Date of Patent: Jun. 7, 1994

[54] VERTICAL LIFT AIRCRAFT

[76] Inventor: Richard H. Zielonka, 61 Mark St., Chicopee, Mass. 01020

[21] Appl. No.: 874,301

[22] Filed: Apr. 24, 1992

[51] Int. Cl.⁵ .............................................. B64C 29/00
[52] U.S. Cl. ..................................... 244/12.2; 244/60;
244/23 C; 244/17.11; 416/115; 416/170 R;
416/128; 474/167; 474/111; 464/185
[58] Field of Search ............ 244/60, 122, 23 C, 17.11;
280/206, 207; 180/10; 440/99–100; 474/166,
167, 237, 134, 111; 416/170 R, 120, 124, 127,
128, 129, 114, 115; 464/51, 185, 30, 55; 192/74

[56] References Cited

U.S. PATENT DOCUMENTS

| 521,673 | 6/1894 | Sacksteder | 280/207 |
|---|---|---|---|
| 2,396,352 | 3/1946 | Vickers | 416/170 |
| 2,717,131 | 9/1955 | Barrett | 244/60 |
| 2,739,768 | 3/1956 | Purpura | 416/116 |
| 3,064,925 | 11/1962 | Preston | 416/170 B |
| 3,065,935 | 11/1962 | Dubbury et al. | 244/23 C |
| 3,193,038 | 7/1965 | Cronkright | 180/10 |
| 3,395,876 | 8/1968 | Green | 244/23 C |
| 3,437,290 | 4/1969 | Norman . | |
| 3,507,461 | 4/1970 | Rosta . | |
| 3,514,053 | 5/1970 | McGuinness . | |
| 3,640,485 | 2/1972 | Mutrux | 244/23 C |
| 3,813,059 | 5/1974 | Jefferson . | |
| 4,196,877 | 4/1980 | Mutrux . | |
| 5,149,012 | 9/1992 | Valverde | 244/23 C |

Primary Examiner—Galen L. Barefoot
Attorney, Agent, or Firm—Fishman, Dionne & Cantor

[57] ABSTRACT

A vertical lift aircraft comprising an aircraft body and a lifting assembly is presented. The lifting assembly comprises a frame wherein at least one airfoil assembly which includes a plurality of airfoils attached to a drive ring is secured. As the drive ring rotates, the airfoils move through the air and create lift. The pitch of the airfoils or blades can be fixed or variable. The drive ring is rotated by a band which is in frictional contact with the inner surface of the drive ring. The band is rotated by at least one pair of rollers which are in frictional contact with the band. Aircraft stability is controlled by regulating airfoil pitch which is responsive to pivoting of a control ring. Alternatively, aircraft stability is provided by regulating the flow of air or gas from a plurality of nozzles disposed about the aircraft. The body, a portion of which may be located inside the lifting assembly, includes a passenger and load carrying compartment and an engine assembly.

28 Claims, 6 Drawing Sheets

VERTICAL LIFT AIRCRAFT

BACKGROUND OF THE INVENTION

This invention relates to an aircraft and, more particularly, to a vertical lift aircraft employing a new and improved lift system.

Presently, helicopters are the most common vertical lift type aircrafts. The helicopters generally employ a single main rotor with a torque-compensating propeller on a boom at the rear of the helicopter. The body of the helicopter is located below the main rotor and is connected to the rotor system by a shaft which drives the rotor.

This conventional configuration has many deficiencies. For example, the rotor blades of the helicopter (generally between two and five) are long and heavy, and are connected to a single rotor hub; resulting in the rotor hub being heavily stressed. Damage to one of the rotor blades can create unbalances which can destroy the entire rotor system. Normal vibrations are also very difficult to damp in a conventional rotor system. The rotor blades, being free at one end, are easily damaged upon impact. The torque compensating propeller consumes a significant part of the engine power and adds a large amount of weight. The body of the helicopter being suspended below the rotor, interferes with the flow of air from the rotor, thus reducing the efficiency of the rotor. The rotor, being positioned high above the body of the helicopter, does not benefit fully from "ground effect", the lift-enhancing phenomena, which occurs when a lifting surface is operated close to the ground. The rotor of the helicopter operates at a much lower RPM than the engine which drives the rotor, necessitating the use of a heavy, RPM-reducing gear box. Other types of vertical lift aircrafts are shown in U.S. Pat. Nos. 3,437,290; 3,507,461; 3,514,053; 3,813,059 and 4,196,877. The above list is only exemplary and is not intended to be a complete list of vertical lift type aircrafts. In general, these patents address many of the deficiencies, noted above, of the helicopter type aircraft. In particular, these patents disclose the use of many airfoils located closer to the ground for providing lift as compared to the few rotor blades used on a helicopter. Further, the use of multiple sets of airfoils is disclosed in U.S. Pat. No. 3,813,059.

SUMMARY OF THE INVENTION

The above discussed and other problems and deficiencies of the prior art are overcome or alleviated by the vertical lift aircraft of the present invention. In accordance with the present invention a lifting assembly of the vertical lift aircraft comprises a frame wherein at least one airfoil assembly which includes a plurality of airfoils attached to a drive ring is secured. The outer end of each airfoil is preferably attached to an outer support ring. As the drive ring rotates, the airfoils move through the air and create lift. The pitch of the airfoils or blades can be fixed or variable. The drive ring is rotated by a band which is in frictional contact with the inner surface of the drive ring. This band is flexible and has sufficient spring characteristics to press up against the inner surface of the drive ring. The band is rotated by at least one pair of rollers. The pair of rollers comprises opposing rollers with the band sandwiched therebetween. The rollers are in frictional contact with the band, which will in turn rotate the drive ring. Any number of airfoil assemblies can be stacked or otherwise arranged to generate as much lift as is required, however two are preferred. With two airfoil assemblies, (i.e. one disposed above the other) it is preferred that they rotate in opposite directions. The passenger, engine and load carrying compartments can be located in the aircraft body within the lifting assembly.

Preferably aircraft stability or control is provided by cyclically and collectively varying the angle of attack of the airfoils (i.e., pitch). In accordance with the present invention each airfoil is disposed on and fits over a pivot shaft which extends out from the drive ring the length of the airfoil. The shaft is attached to the drive ring so that it is fixed and the airfoil is allowed to pivot or rotate about the shaft. At the drive ring, a coil spring is disposed about the shaft, with one end of the spring attached to the drive ring and the other end of the spring attached to the airfoil. When the spring and airfoil are installed, the spring is preloaded so that it tends to turn the airfoil so as to hold a roller located at the rear of the airfoil against the pitch controlling control ring. Each airfoil has a roller fixed to its trailing edge either directly or by a bracket at the drive ring end of the airfoil. The roller of each airfoil rolls along the surface of a control ring which is located adjacent to the airfoils and coaxially with the drive ring. As one end of the control ring is lifted, the rollers of each airfoil passing over the end will also be lifted, which will decrease the angle of attack of the lifted airfoils.

Control can be provided by feeding compressed gas or air to adjustable nozzles located in the front, back and on each side of the aircraft. By modulating the gas (or air) flow from each nozzle, the aircraft can be made to tilt in any direction.

The present invention employs a large number of small, light, airfoils connected to the drive ring. In the present invention, the stresses and vibrations of the airfoils or blades are distributed over a larger area, (i.e. the drive ring), as compared to a hub of the helicopter rotor (i.e. a single point). Further, damage to one airfoil will not greatly affect the balance of the airfoil assembly, unlike prior art helicopters where damage to one blade of the rotor greatly affects rotor balance. Vertical stacking of two counter-rotating airfoil assemblies eliminates the need for a torque-compensating propeller. Further, by attaching the airfoils to the drive ring instead of a hub (as in the prior art), the body of the aircraft can be placed in the same plane as the airfoil assembly. This allows the body of the aircraft to be disk-shaped, which is believed to be stronger and lighter with a lower drag coefficient than the body of the prior art helicopters. It will be appreciated that the aircraft body is located outside of the airflow path of the airfoils. This alignment of the body of the aircraft in the plane of the lifting assembly allows the rotor to be placed closer to the ground resulting in more pronounced "ground-effects" for a given ground-to-body distance.

The other types of vertical lift aircrafts discussed hereinbefore do not disclose the drive means of the present invention. More particularly, a band in frictional contact with the drive ring, the band being rotated by a roller driver system. Further the prior art also does not disclose control of airfoil pitch by pivoting a control ring which is in communication with the airfoils.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE DRAWINGS

Figure 1:
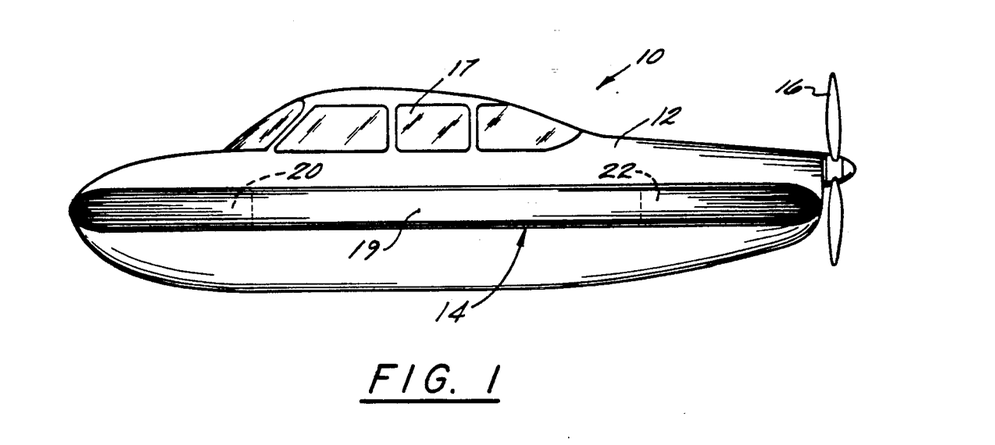
FIG. 1 is a side elevational view of an aircraft in accordance with the present invention.
Figure 2:
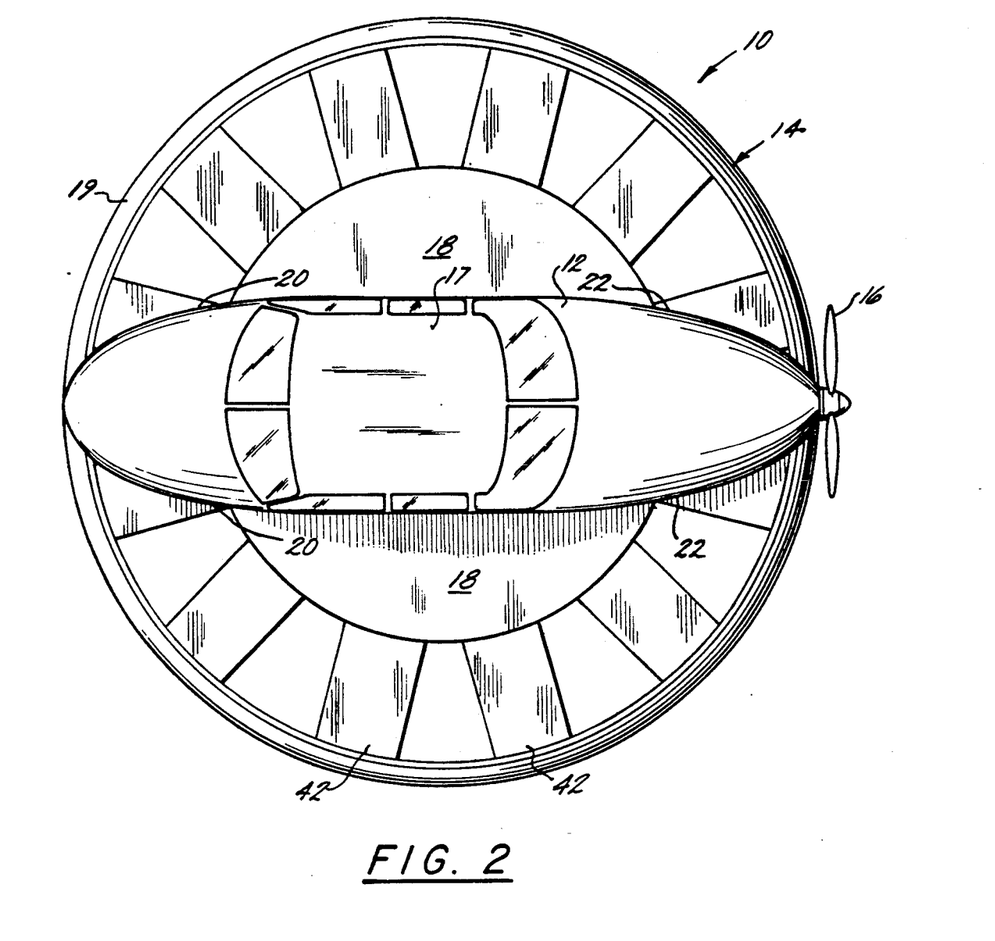
FIG. 2 is a top view of the aircraft of FIG. 1.

Referring to FIGS. 1 and 2, a vertical lift aircraft in accordance with the present invention is shown generally at 10. Aircraft 10 comprises a body 12, lifting assembly 14 and a propeller 16 located a the rear of aircraft 10 for forward propulsion of aircraft 10. While propeller 16 is preferred as a means for generating forward propulsion, lifting assembly 14 can also generate forward propulsion as will be described hereinafter. Also, other means of forward propulsion may be employed (e.g., a jet engine) without departing from the spirit or scope of the present invention. Body 12 includes a passenger compartment 17 (including flight crew) located at about the center of body 12. Body 12 may be any type of body commonly used with aircrafts. A shell 18 protects the interior portions of lifting assembly 14. Lifting assembly 14 which is covered by an outer cover 19, passes through an opening 20 at the front of body 12 and through an opening 22 at the rear of body 12. This alignment of body 12 in the plane of lifting assembly 14 results in more pronounced ground effects.

Figure 3:
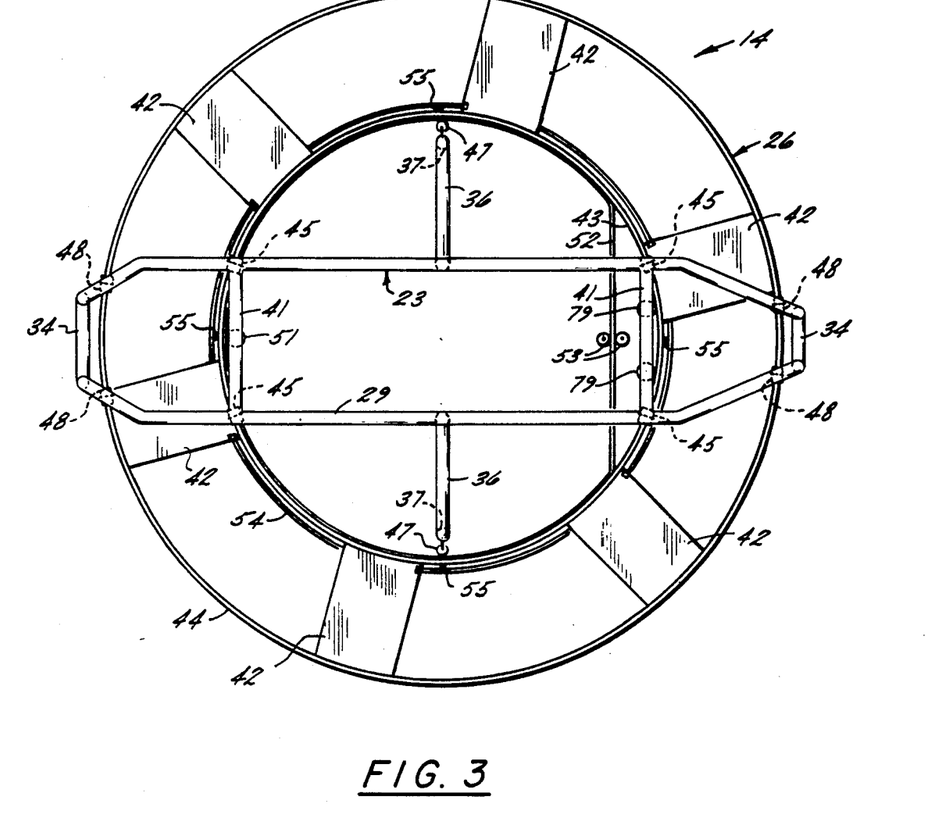
FIG. 3 is a top view of the lifting assembly used in the aircraft of FIG. 1.
Figure 4:
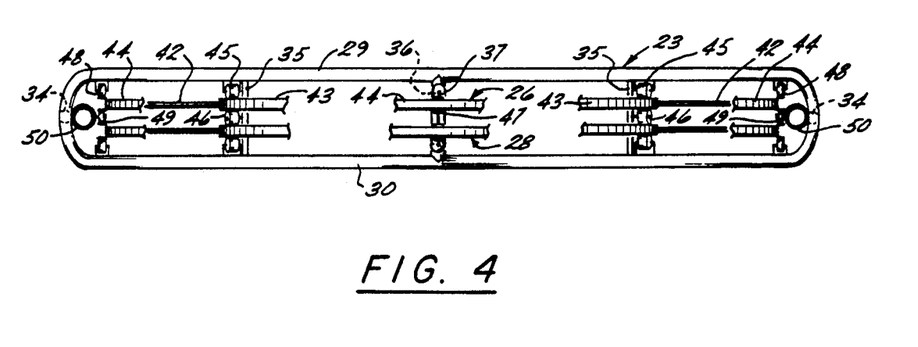
FIG. 4 is a side elevational view of the lifting assembly used in the aircraft of FIG. 1.

Referring to FIGS. 3 and 4, lifting assembly 14 is shown without an outer cover 19. Assembly 14 comprises a frame 23 wherein upper and lower airfoil assemblies 26 and 28 are secured. Frame 23 is attached to the body 12 of aircraft 10. While one airfoil assembly may suffice, two coaxially arranged airfoil assemblies 26 and 28 are preferred. Airfoil assemblies 26 and 28 are vertically stacked and are counter-rotated. It will be noted that two counter-rotated airfoil assemblies 26 and 28 eliminates the need for a torque-compensating propeller, such is required with most prior art helicopters. Frame 23 comprises an upper support member 29 and a lower support member 30. Upper and lower support members 29 and 30 are attached at each end by end members 34 and at the interior by vertical support members 35. Upper and lower support members 29 and 30 include extending members 36 located at about the center of members 29 and 30. Extending members 36 from the upper and lower members 29 and 30 are connected by side members 37. Each upper and lower member 29 and 30 includes a pair of cross members 41. Frame 23 is secured to the body 12 of aircraft 10 by conventional methods. Further, cover 19 is secured to frame 23 at members 29, 30 and 34 by conventional means as is clearly shown in FIG. 4.

As Assembly 26 and assembly 28 are of the same type and operate in the same manner, only assembly 26 will be described herein. Assembly 26 includes a plurality of airfoils or blades 42. One end of airfoils 42 is pivotably attached to a drive ring 43 where the outer end thereof is pivotably attached to an outer support ring 44. Drive ring 43 is supported in frame 23 by rollers 45 which are attached to upper support member 29 and by rollers 46 which are attached to vertical support members 35. Drive ring 43 is also supported in frame 43 at extending members 36 by rollers 47. Support ring 44 is supported in frame 23 by rollers 48 which are attached to upper support member 29 and by rollers 49 which are attached to a tubular member 50. At a member (not shown) extending downwardly from one of cross members 41 includes a roller 51 positioned for contact with drive ring 43. A pair of other members (not shown) extend downwardly from the other one of cross members 41 with each including a roller 79 positioned for contact with drive ring 43. It should be noted that assembly 26 is not affixed to frame 23, rather the rollers 45-49, 51 and 79 are employed to allow assembly 26 to rotate freely relative to frame 23.

Outer ring 44 is preferred although it is not required for the present invention. Outer ring 44 protects airfoils 42 from impact damage and reduces the airflow around the outer edges of airfoils 42, which increases the efficiency of airfoil assembly 26. Further, although only six airfoil blades 42 are shown in FIG. 3, it is intended that any number of blades 42 may be employed. This is feasable since blades 42 are smaller and substantially lighter than the prior art helicopter rotor blades. The stresses and vibrations of airfoils 42 are distributed over the surface of drive ring 43. This is believed to be a significant improvement over the prior art, where the helicopter rotor blades are connected at the hub, a much smaller surface area.

Drive ring 43 is driven by an inner band 52. Inner band 52 has spring like characteristics which force band 52 against drive ring 43 for rotation in unison therewith. Band 52 is rotated by a pair of opposing rollers 53, thereby rotating drive ring 43 with blades 42. It should be noted that the two rollers 79 on frame 23 are employed instead of one in order to avoid any interference with rollers 53. Band 52 is preferably a continuous strip of material with a high modulus of elasticity such as high carbon spring steel or fiberglass. Generally band 52 is circular with a diameter slightly less than the inner diameter of drive ring 43, to allow easy assembly. When band 52, drive ring 43 and drive rollers 53 are assembled, the portion of band 52 which is gripped by drive rollers 53 is deformed towards the center of band 52. This causes a major portion of band 52 to press up against the inside of drive ring 43. Due to the friction between band 52 and drive ring 43, any movement of band 52 will cause a comparable movement in ring 43. This effect can be enhanced by coating the inside of drive ring 43 with a high coefficient of friction material. This is maybe required to avoid any slippage between drive ring 43 and inner band 52.

The portion of band 52 that lies between drive rollers 53 and drive ring 43, in the direction of rotation, will tend to bend as power is applied to drive rollers 53. Band 52 must be sufficiently thick to resist this bending force.

The material or drive rollers 53 is dependent upon the material used for band 52. If band 52 is made from high carbon spring steel, the drive rollers 53 can be made from a material of comparable hardness such as hardened steel. This combination of steel pressing against steel, will allow high pressures to be exerted. This will increase the amount of power that can be transmitted as compared to a drive roller/band combination which would not allow such high pressures. The rolling efficiency of a steel against steel combination is also very high.

The revolutions per minute (RPM) of drive rollers 53 will be much higher than the RPM of drive ring 52, because of the difference between their diameters, thus resulting in an RPM reduction which provides a better match between a normally high RPM engine such as a gas turbine which is used in most modern helicopters, and the low RPMs which are required for a large diameter rotor system. This built-in RPM reducing capability reduces or eliminates the need for a heavy and costly gear box.

In this preferred embodiment, a control ring 54 is pivoted at a plurality of pivot arms 55. Control ring 54 pivots to adjust the pitch of blades 42, as is described hereinafter.

Figure 5:
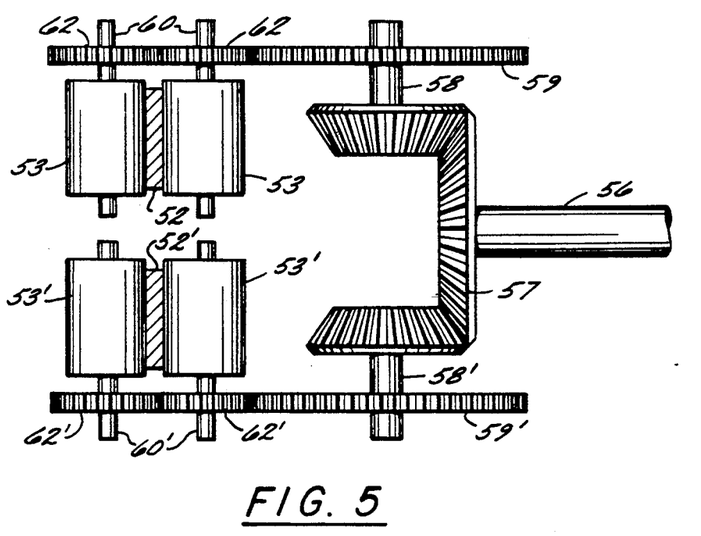
FIG. 5 is a side elevational view partly in cross section of the drive rollers and drive means used in the aircraft of FIG. 1.
Figure 6:
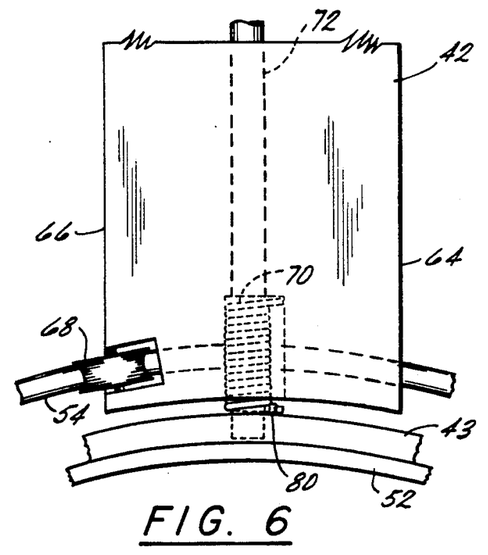
FIG. 6 is a partial top view of a portion of the airfoil assembly used in the lifting assembly of FIG. 3.
Figure 6A:
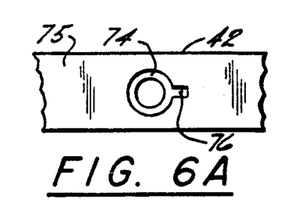
FIG. 6A is a partial end view of the airfoil of FIG. 6.
Figure 6B:
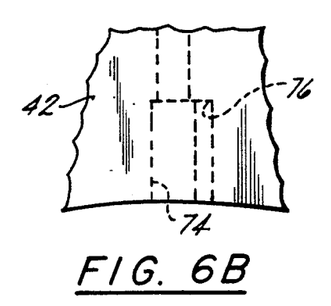
FIG. 6B is a partial top view of the airfoil of FIG. 6.
Figure 6C:
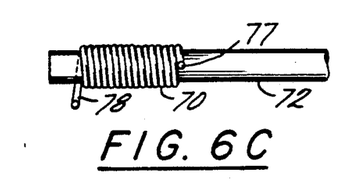
FIG. 6C is a partial side elevational view of the spring and pivot shaft used in the airfoil of FIG. 6.
Figure 6D:
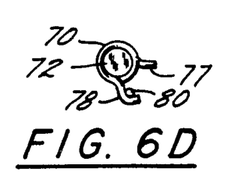
FIG. 6D is an end view of the spring, pivot shaft and retaining post used in the airfoil of FIG. 6.

Referring now to FIG. 5, a means for driving drive rollers 53 and 53' is shown. Rollers 53 are associated with assembly 26 and rollers 53' are associated with lower assembly 28. The primed numbers herein are used to designate corresponding elements of the lower assembly 28. A drive shaft 56 driven by an engine (not shown) is coupled to 57 to rotate, thereby rotating a shaft 58, 58' which is coupled to gear 57. The other end of shaft 58, 58' is affixed to a spur gear 59, 59'. Rollers 53, 53' have shafts 60, 60' extending therethrough for rotation in unison therewith. One end of shafts 60, 60' has a gear 62, 62' affixed thereto, each of which meshes with the other and one of which meshes with gear 59, 59'. Band 52, 52' is sandwiched between rollers 53, 53', whereby band 52, 52' is advanced as the rollers are rotated. It will be appreciated that any autorotation of assemblies 26 and 28 is to be compensated for by a conventional clutch assembly (not shown) between the engine and drive shaft 56.

Referring to FIGS. 6 and 6A-D, a portion of a single airfoil 42 is shown at the end connected to drive ring 43. Airfoil 42 comprises a pair of opposing sides forming a leading edge 64 and a trailing edge 66. A roller 68 which communicates with control ring 54 is located on the trailing edge 66. Airfoil 42 is biased by a preloaded spring 70 to maintain contact between roller 68 and control ring 54. Spring 70 is disposed on a pivot shaft 72. Spring 70 is located in an opening 74 on surface 75 of airfoil 42 which has a slot 76. An extension 77 of spring 70 is positioned in slot 76 to prohibit rotation of spring 70. A second extension 78 of spring 70 is retained by a post 80 extending from the outer surface of drive ring 43. Shaft 72 is fixed and does not rotate relative to airfoil 42. Shaft 72 also provides connection of airfoil 42 to drive ring 43 by conventional means. It will be appreciated that the pitch or angle of attack of airfoils 42 can be selected to provide forward propulsion as is well known in the art.

Figure 7A:
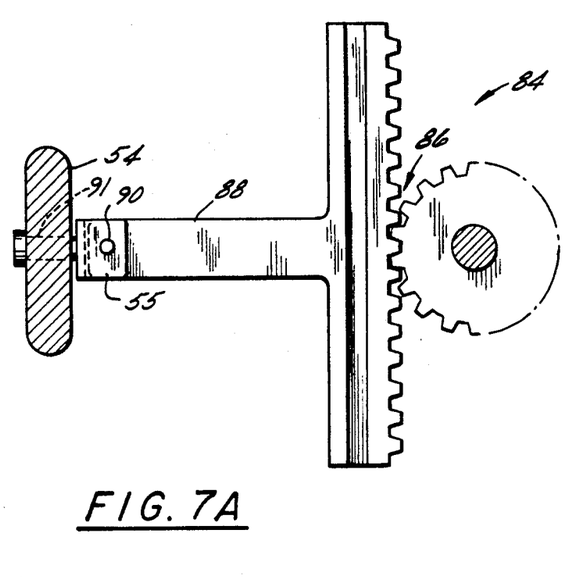
FIG. 7A is a side elevational view of the control means for the control ring used in the lifting assembly of FIG. 3.
Figure 7B:
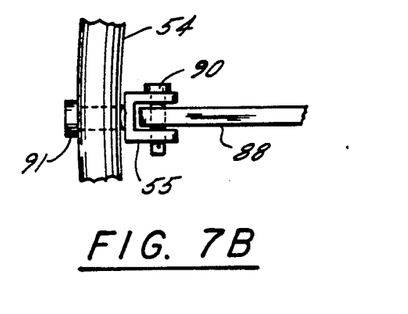
FIG. 7B is a partial top view of the control means for the control ring of FIG. 7A.
Figure 8:
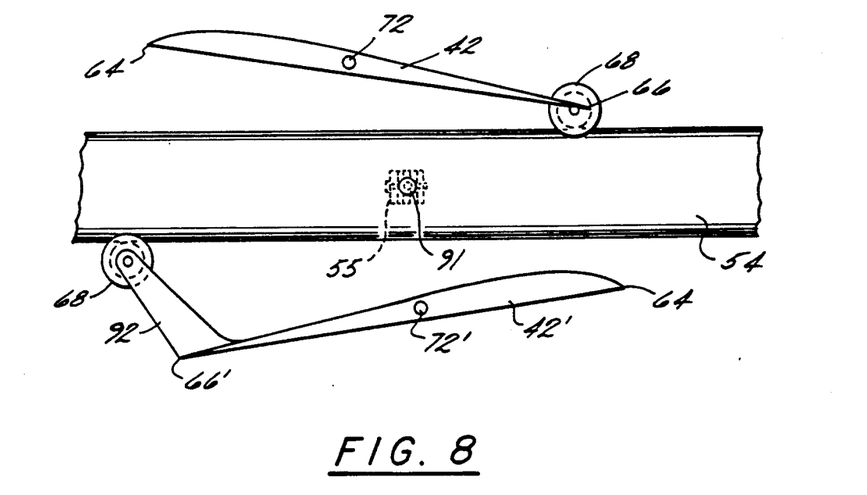
FIG. 8 is a partial side elevational view partly in cross section of the control ring with two air foils having rollers in contact with the control ring used in the lifting assembly of FIG. 3.

Referring to FIGS. 7A-B and 8, means for pivoting control ring 54 is shown generally at 84. A rack and pinion assembly 86 driven by a motor (not shown) determines blade 42 pitch by raising or lowering control ring 54 at arms 55. A shaft 88 is attached to assembly 86 at one end and is pivotably attached to control ring 54 at the other end. This pivotable attachment comprises a pivot pin 90 extending through an opening in shaft 88 and attached at each end to arms 54. Pin 90 is fixed and does not rotate in relation to shaft 88. Arms 55 are rotatable relative to control ring 54 by a pivot pin 91. This pivotable attachment is employed to reduce the amount of stress at this point, that would otherwise exist with a fixed attachment. Accordingly control ring 54 is raised or lowered with shaft 88. Each control point having arms 55 (FIG. 3) has corresponding control means 84. Further, it is preferred that opposing control points be operated in unison to avoid additional stresses on control ring 54. An extension bracket 92 is required between the trailing edge 66' of the lower airfoils 42' and the rollers 68' in order to ensure a proper angle of attack for airfoils 42', as is clearly shown in FIG. 8.

Figure 9:
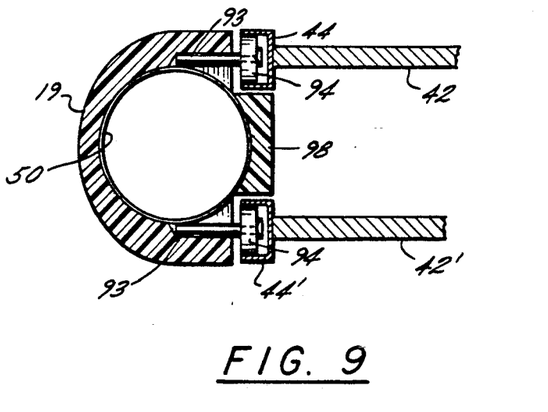
FIG. 9 is a cross sectional view of the cover and the tubular member used in the aircraft of FIG. 1.

Referring to FIG. 9, tubular member 50 which completely encircles outer rings 44 and 44' for protection and support is shown. Tubular member 50 is rigidly attached to frame 23 at each end. Attached to tubular member 50 are several axles 93, at appropriate locations along the length of member 50. Attached to the free end of axles 93 are rollers 94. Rollers 94 fit inside U-shaped outer rings 44 and 44'. Rollers 94 allow outer rings 44 and 44' to rotate freely while prohibiting vertical movement of outer rings 44 and 44'. Spacer 98 is attached to tubular member 50 along its entire length except at frame 23. Spacer 98 reduces airflow around the outside of outer rings 44 and 44' which increases the efficiency of the rotor system. Cover 19 is attached to member 50. The purpose of cover 19 is to protect member 50, axles 93, rollers 94 and outer rings 44 and 44'. Cover 19 is preferably aerodynamicly shaped to reduce the drag of the aircraft during flight. Cover 19 may be comprised of any light weight resilient material (e.g., formed plastic).

Figure 10:
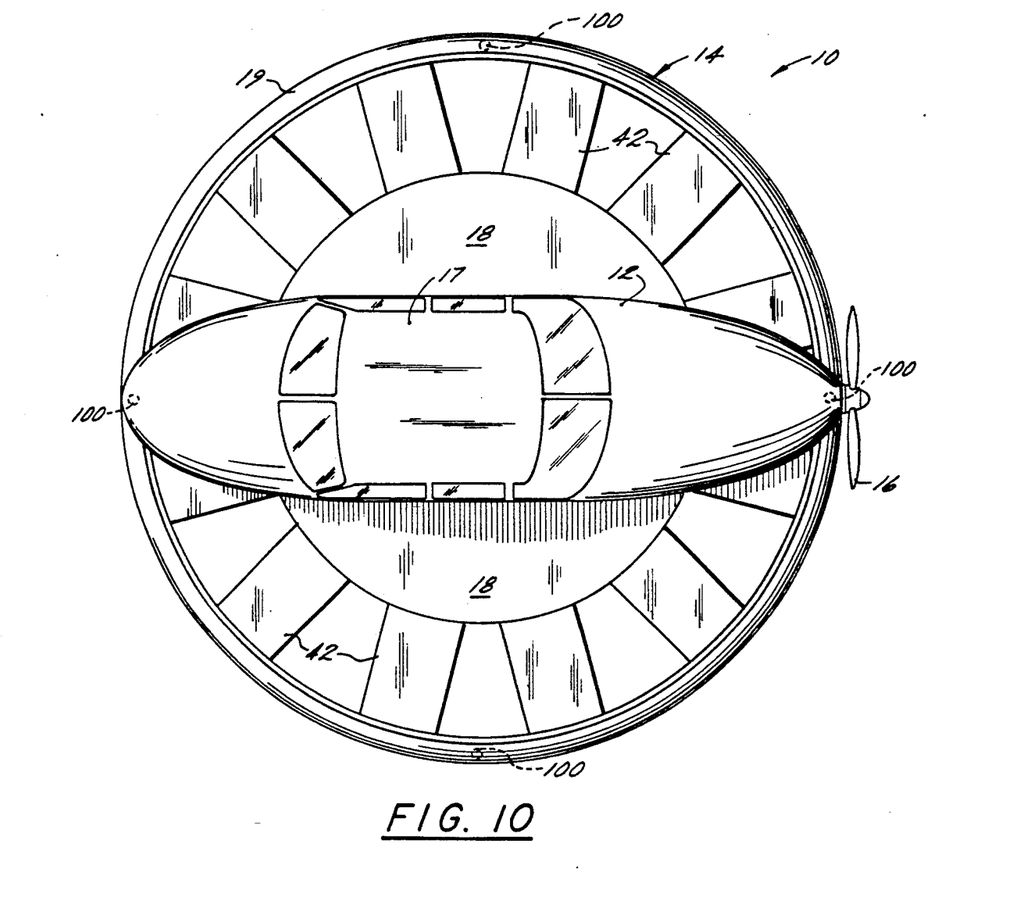
FIG. 10 is a top view of an aircraft in accordance with an alternate embodiment of the present invention.
Figure 11A:
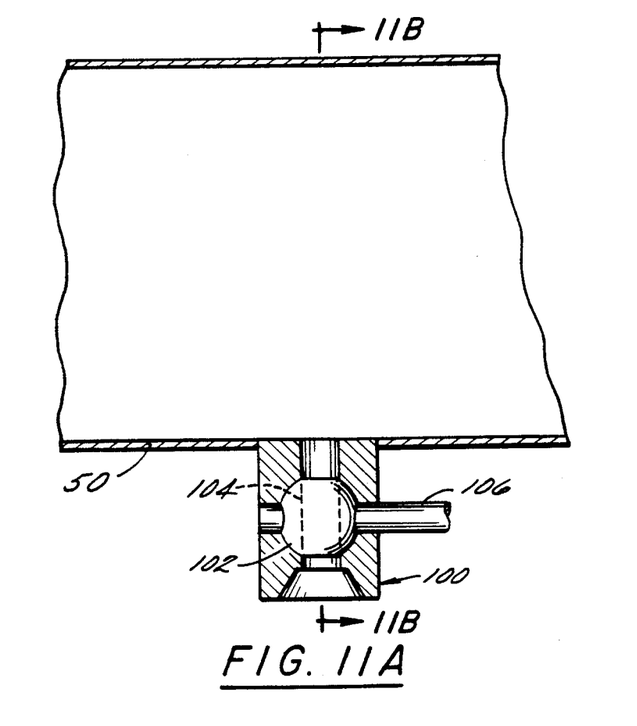
FIG. 11A is a side elevational view partly in cross section of a nozzle used in the alternate embodiment of FIG. 10.
Figure 11B:
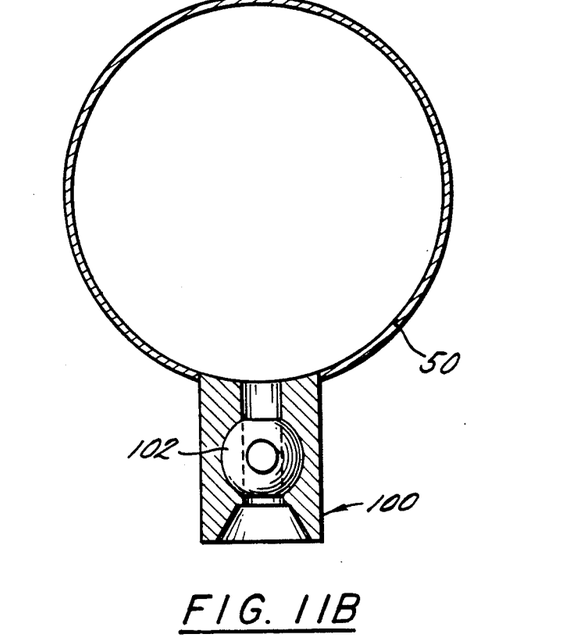
FIG. 11B is a cross sectional view taken along the line 11B—11B in FIG. 10A.

Referring to FIGS. 10 and 11A-B, in an alternate embodiment of the present invention airfoils 42 may be fixedly attached to drive ring 43 at a predetermined angle of attack or pitch or pivotably attached to drive ring 43 as described hereinbefore. In this embodiment control is provided by feeding gas from a gas generator or air from an air compressor (either of which are located in body 12 of aircraft 10) to adjustable nozzles 100 via tubular member 50. Nozzles 100 are preferably attached at the front, back and each side of aircraft 10. Nozzles 100 extend downwardly through cover 19. A ball valve 102 is disposed in each nozzle 100. Valve 102 includes an opening 104 which allows air flow from member 50 through nozzle 100 in the open position and prohibits air flow in the closed position. A shaft 106 is employed to control valve 102 by rotating ball valve 102, thereby moving opening 104 in and out of alignment with nozzle 100. Shaft 106 is to be controlled by conventional means. Modulation of the gas (or air) flow to each nozzle is used to control tilt of the aircraft 10.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A vertical lift aircraft comprising:
   a body;
   lifting means having frame means attached to said body, said lifting means including;
   (a) first drive ring means for being rotated in a first direction, said first drive ring means being supported by said frame means;
   (b) a first plurality of airfoil means each attached at one end to said first drive ring means for rotation in unison therewith;
   (c) first band means disposed within said first drive ring means, a substantial portion of one surface of said first band means being in frictional contact with a substantial portion of one surface of said first drive ring means, said first band means having spring like characteristics for maintaining contact between said first band means and said first drive ring means, wherein said first drive ring means rotates in unison with said first band means; and
   (d) first roller drive means communicating with said first band means wherein said first band means rotates in response to rotation of said first roller drive means; and
   drive means for rotating said first roller drive means.

2. The aircraft of claim 1 further comprising:
   propulsion means being attached to said body for providing horizontal propulsion.

3. The aircraft of claim 1 wherein said lifting means further comprises:
   outer ring means attached at one end of each of said first plurality of airfoil means for rotation in unison therewith, said outer ring means supported by said frame means.

4. The aircraft of claim 3 further comprising:
   a tubular member attached to said frame means; and
   cover means supported by said tubular member.

5. The aircraft of claim 4 further comprising:
   tilt control means having a plurality of adjustable nozzles, said nozzles attached to and in communication with said tubular member, one end of at least one of said nozzles extending through said cover means at defined locations, said tilt control means for controlling the tilt of the aircraft, said nozzles being responsive to a compressed gas in said tubular member.

6. The aircraft of claim 5 wherein said plurality of adjustable nozzles comprises four nozzles, two of said nozzles being located at laterally opposing sides of said body, two other of said nozzles being located at opposing front and rear ends of said body.

7. The aircraft of claim 5 wherein each of said nozzles further comprises:
   valve means for regulating the flow of said compressed gas.

8. The aircraft of claim 1 wherein said lifting means further comprises:
   pivot shaft means extending longitudinally through said first airfoil means, said pivot shaft means fixedly attached to said first drive ring means, said first airfoil means being rotatable relative to said pivot shaft means;
   control ring means disposed near said first drive ring, said control ring means being pivotable at defined locations; and
   roller means attached to said first airfoil means, said roller means in contact with said control ring means,
   wherein said first airfoil means pivots about said pivot shaft means in response to pivoting of said control ring.

9. The aircraft of claim 8 further comprising:
   spring means disposed about said pivot shaft means, said spring means restrained at one end to said airfoil means and restrained at the other end at said first drive ring means, said spring means being preloaded to assure contact between said roller means and said control ring.

10. The aircraft of claim 8 wherein said defined locations for pivoting said control means comprises four locations, two of said locations being at laterally opposing sides of said first drive ring means and two other of said four locations being at opposing front and rear ends of said first drive ring means.

11. The aircraft of claim 8 further comprising:
    a tubular member attached to said frame means;
    cover means supported by said tubular member; and
    tilt control means having a plurality of adjustable nozzles, said nozzles attached to and in communication with said tubular member, one end of at least one of said nozzles extending through said cover means at defined locations, said tilt control means for controlling the tilt of the aircraft, said nozzles being responsive to a compressed gas in said tubular member.

12. The aircraft of claim 1 wherein said lifting means further comprises:
    second drive ring means for being rotated in a second direction, said second drive ring means being supported by said frame means;
    a second plurality of airfoil means each attached at one end to said second drive ring means for rotation in unison therewith;
    second band means disposed within said second drive ring means, a substantial portion of one surface of said second band means being in frictional contact with a substantial portion of one surface of said second drive ring means, said second band means having spring like characteristics for maintaining contact between said second band means and said second drive ring means, wherein said second drive ring means rotates in unison with said second band means; and
    second roller drive means communicating with said second band means wherein said second band means rotates in response to rotation of said second roller drive means,
    wherein said drive means rotates said second roller drive means.

13. The aircraft of claim 12 wherein said first direction of rotation of said first drive means is opposite said second direction of rotation of said second drive means; and wherein said first drive means is disposed above said second drive means.

14. The aircraft of claim 12 wherein said lifting means further comprises:

control ring means disposed near said first and second drive ring means, said control ring means being pivotable at defined locations;

first pivot shaft means extending longitudinally through said first airfoil means, said first pivot shaft means fixedly attached to said first drive ring means, said first airfoil means being rotatable relative to said first pivot shaft means;

first roller means attached to each of said first airfoil means, said first roller means in contact with said control ring means;

second pivot shaft means extending longitudinally through said second airfoil means, said second pivot shaft means fixedly attached to said second drive ring means, said second airfoil means being rotatable relative to said second pivot shaft means; and second roller means attached to said second airfoil means, said second roller means in contact with said control ring means, wherein said first and second airfoil means pivot about said corresponding first and second pivot shaft means in response to pivoting of said control ring.

15. The aircraft of claim 14 further comprising:

first spring means disposed about said first pivot shaft means, said first spring means restrained at one end to said first airfoil means and restrained at the other end at said first drive ring means, said first spring means being preloaded to assure contact between said first roller means and said control ring; and second spring means disposed about said second pivot shaft means, said second spring means restrained at one end to said second airfoil means and restrained at the other end at said second drive ring means, said second spring means being preloaded to assure contact between said second roller means and said control ring.

16. The aircraft of claim 14 wherein said defined locations for pivoting said control means comprises four locations, two of said locations being at laterally opposing sides of said first and second drive ring means and two other of said four locations being at opposing front and rear ends of said first and second drive ring means.

17. The aircraft of claim 14 further comprising:

a tubular member attached to said frame means;

cover means supported by said tubular member; and tilt control means having a plurality of adjustable nozzles, said nozzles attached to and in communication with said tubular member, one end of at least one of said nozzles extending through said cover means at defined locations, said tilt control means for controlling the tilt of the aircraft, said nozzles being responsive to a compressed gas in said tubular member.

18. The aircraft of claim 12 wherein said lifting means further comprises:

first outer ring means attached at one end of each of said first plurality of airfoil means for rotation in unison therewith, said first outer ring means supported by said frame means; and second outer ring means attached at one end of each of said second plurality of airfoil means for rotation in unison therewith, said second outer ring means supported by said frame means.

19. The aircraft of claim 18 further comprising:

a tubular member attached to said frame means; and cover means supported by said tubular member.

20. The aircraft of claim 19 further comprising:

tilt control means having a plurality of adjustable nozzles, said nozzles attached to and in communication with said tubular member, one end of at least one of said nozzles extending through said cover means at defined locations, said tilt control means for controlling the tilt of the aircraft, said nozzles being responsive to a compressed gas in said tubular member.

21. The aircraft of claim 20 wherein said plurality of adjustable nozzles comprises four nozzles, two of said nozzles being located at laterally opposing sides of said body, two other of said nozzles being located at front and rear ends of said body.

22. The aircraft of claim 20 wherein each of said nozzles further comprises:

valve means for regulating the flow of said compressed gas.

23. A vertical lift aircraft comprising:

a body; and lifting means having frame means attached to said body, said lifting means including;

(a) first drive ring means for being rotated in a first direction, said first drive ring means being supported by said frame means;

(b) a first plurality of airfoil means each attached at one end to said first drive ring means for rotation in unison therewith;

(c) first pivot shaft means extending longitudinally through said first airfoil means, said first pivot shaft means fixedly attached to said first drive ring means, said first airfoil means being rotatable relative to said first pivot shaft means;

(d) control ring means disposed near said first drive ring, said control ring means being pivotable at defined locations; and (e) first roller means attached to said first airfoil means, said first roller means in contact with said control ring means, wherein said first airfoil means pivots about said first pivot shaft means in response to pivoting of said control ring.

24. The aircraft to claim 23 further comprising:

propulsion means attached to said body for providing horizontal propulsion.

25. The aircraft of claim 23 further comprising:

spring means disposed about said first pivot shaft means, said spring means restrained at one end to said first airfoil means and restrained at the other end at said first drive ring means, said spring means being preloaded to assure contact between said first roller means and said control ring.

26. The aircraft of claim 23 wherein said defined locations for pivoting said control means comprises four locations, two of said locations being at laterally opposing sides of said first drive ring means and two other of said four locations being at opposing front and rear ends of said first drive ring means.

27. The aircraft of claim 23 further comprising:

second drive ring means for being rotated in a second direction;

a second plurality of airfoil means each attached at one end to said second drive ring means for rotation in unison therewith;

second pivot shaft means extending longitudinally through said second airfoil means, said second pivot shaft means fixedly attached to said second drive ring means, said second airfoil means being rotatable relative to said second pivot shaft means; and second roller means attached to said second airfoil means, said second roller means in contact with said control ring means, wherein said second airfoil means pivots about said second pivot shaft means in response to pivoting of said control ring.

28. The aircraft of claim 27 further comprising: first spring means disposed about said first pivot shaft means, said first spring means restrained at one end to said first airfoil means and restrained at the other end at said first drive ring means, said first spring means being preloaded to assure contact between said first roller means and said control ring; and second spring means disposed about said second pivot shaft means, said second spring means restrained at one end to said second airfoil means and restrained at the other end at said second drive ring means, said second spring means being preloaded to assure contact between said second roller means and said control ring.

* * * * *